Dec. 19, 1944.   K. L. WOODMAN   2,365,615
AUTOMATIC TEMPERATURE CONTROL FOR ELECTRIC COFFEE MAKERS
Filed Sept. 17, 1941
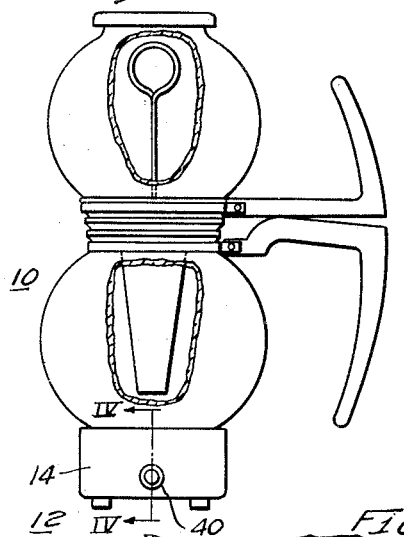
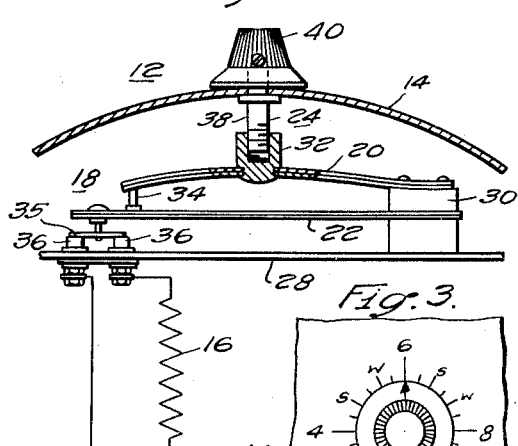
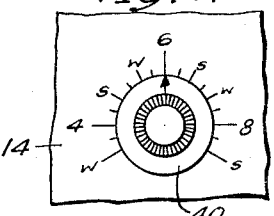
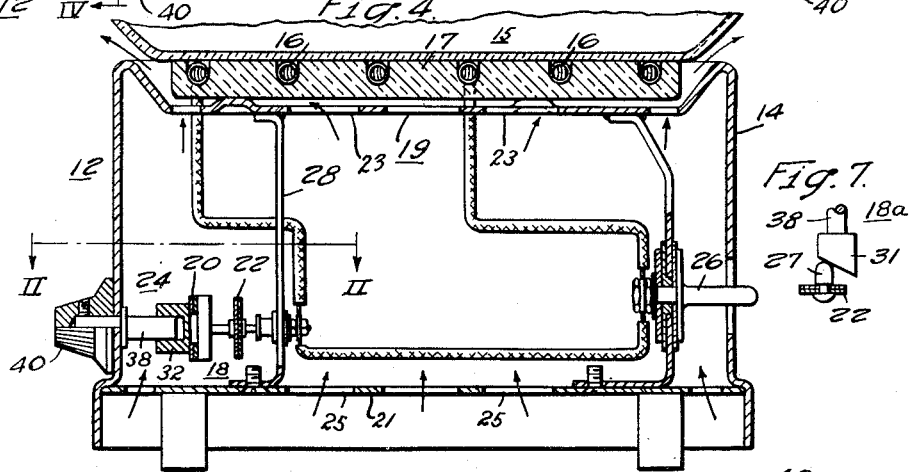
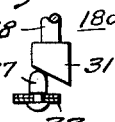
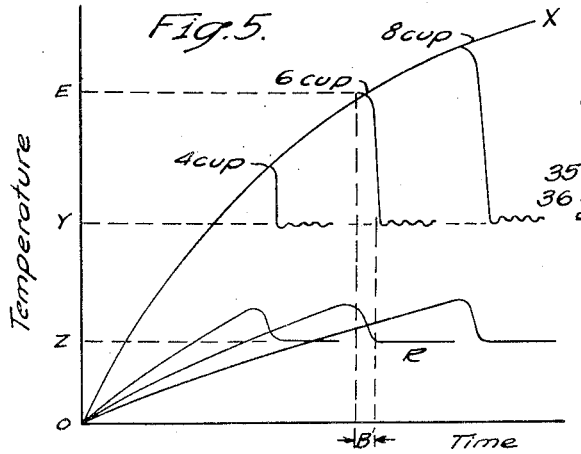
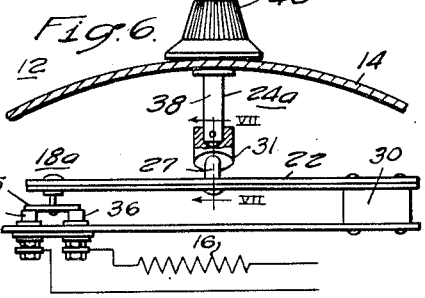
INVENTOR
Kenneth L. Woodman.
BY
W. R. Coley
ATTORNEY Patented Dec. 19, 1944

2,365,615

UNITED STATES PATENT OFFICE 2,365,615

AUTOMATIC TEMPERATURE CONTROL FOR ELECTRIC COFFEE MAKERS

Kenneth L. Woodman, Mansfield, Ohio, assignor to Westinghouse Electric & Manufacturing Company, East Pittsburgh, Pa., a corporation of Pennsylvania Application September 17, 1941, Serial No. 411,112

7 Claims. (Cl. 219—43)

My invention relates to electric percolators and, more particularly, to an automatic temperature control for electric percolators.

It is an object of my invention to provide a control for an electric coffee maker or percolator which will automatically cause the heating element to provide a high or coffee brewing temperature and then to automatically reduce the heat output of the heating element to such value that it will maintain the brewed coffee at a serving temperature substantially below that of the brewing temperature.

It is a further object of my invention to provide a coffee maker or percolator heating stand having a thermostatic structure therein, in heat relationship with a heating element, which is adapted to automatically control the output of such heating element for producing a high heat output for a predetermined time and then to produce a substantially lower heat output as long as the heating element is connected to a suitable power supply.

It is another object of my invention to provide a simple, inexpensive coffee maker or percolator heating stand which embodies an automatic temperature control structure for maintaining a brewing temperature throughout a predetermined selective time depending upon the quantity of coffee to be brewed and for automatically reducing the temperature of such coffee so as to maintain it at a desired temperature.

It is still another object of my invention to provide a control for an electric coffee maker which will cause the heating element to provide a high heat output during a predetermined liquid heating period, deenergize the heating element for a predetermined time period to permit proper infusion of the coffee, and intermittently energize the heating element to maintain a predetermined low heat output thereafter.

It is still a further object of my invention to provide a heater control for a coffee maker having a lower vessel for receiving water and an upper vessel for receiving coffee grounds, which controls the energization of the heating element to provide a high heat for a preselected time, depending upon the quantity of coffee to be brewed, to produce the necessary pressure within the lower vessel so as to force such water upwardly into the upper vessel for infusion, which deenergizes the heating element when the liquid has been evacuated from the lower vessel and elevated into the upper vessel permitting the coffee to be brewed within the upper vessel, and which upon the completion of such infusion period and the return of the brew to the lower vessel intermittently reenergizes the heating element to maintain such brew at the desired serving temperature.

It is still a further object of my invention to provide a percolator heating stand having a thermostatic control for regulating the heat output of a heating element incorporated therewith which has adjustable control means operable by an operator, whereby when the coffee has brewed a desired length of time, such control means may be operated so as to permit the thermostatic structure to maintain the temperature of such brewed coffee at a predetermined serving temperature.

Yet another object of my invention is to provide a percolator having a heating unit in which the infusion time of the percolator is a function of the thermal storage capacity of the heating unit and the rate of cooling thereof.

Other objects of my invention will either be pointed out specifically in the course of the following description of a device embodying my invention, or will be apparent from the description taken in conjunction with the accompanying drawing, in which:

Figure 1 is an elevational view partly in section of a coffee maker incorporated with a heating stand embodying my invention;

Fig. 2 is a partial sectional view taken along the line II—II of Fig. 4;

Fig. 3 is a partial plan view of the heating stand of Fig. 2;

Fig. 4 is an enlarged sectional view of the heating stand embodying my invention taken along the line IV—IV of Fig. 1;

Fig. 5 is a graph having curves illustrating the operating characteristics of the heating element and thermostatic control embodying my invention;

Fig. 6 is a view similar to Fig. 2 illustrating a modified form of my invention; and Fig. 7 is a partial side view taken along the line VII—VII of Fig. 6.

Referring to the accompanying drawing, in which like reference characters indicate like parts in the several figures, there is illustrated a coffee maker or percolator which may be of any well known type 10 having a heating stand 12 which comprises an exterior casing 14, a heating unit 15, and a thermostatic structure 18 responsive to the heat developed by the heating unit 15 for regulating the operation of such element. The thermostatic structure 18 comprises a first heat responsive device 20, a second heat responsive device 22, and a control means 24 therefor.

The coffee maker or percolator 10, which may be of any well known type, has a lower vessel which rests upon the heating stand 12 in direct contact with the heating unit 15 for a purpose hereinafter described and an upper vessel which is adapted, through the agency of a gasket to tightly fit within such lower vessel. The lower vessel normally retains water to be heated, while the upper vessel is adapted to retain the ground coffee in keeping with established practice. The water or liquid in the lower vessel is forced upwardly, due to the increase in pressure therein as such liquid is heated, say, by means of applicant's heating stand 12, into the upper vessel, in which place infusion with the ground coffee or grounds takes place, in a well known manner. The temperature of the lower vessel is then lowered to permit the passage of the brewed coffee back down into the lower vessel, as hereinafter described.

The heating stand 12 comprises, in this instance, a substantially cylindrically shaped casing 14 having a centrally depressed top portion 19 which receives the heating unit 15 and a bottom plate 21 extending across the bottom portion of and attached to said casing 14. The exterior casing 14 is preferably formed of any light weight sheet material. A plurality of apertures 23 and 25 are located within the top portion 19 and bottom plate 21, respectively, to provide a passage for the flow of air through the heating stand 12 and about the heating unit 15 for cooling said unit, as hereinafter described.

The heating unit 15 comprises, in this instance, a flat plate or disc-shaped member 17 formed of an insulating material, such as porcelain, having spiral grooves in its upper surface for receiving suitable electrical resistance heating elements 16. The flat insulating brick or plate 17 is retained slightly above the top surface of the top portion 19 of the casing 14 to permit air passing through said casing to come in contact with said plate to cool it as hereinafter described. The resistance element 16 of the heating unit 15 is connected to a suitable power supply, not shown, by means of well known prong receptacle members 26 and is connected in series with the thermostatic structure 18 which is in thermal communication therewith.

The thermostatic structure 18 embodies the first heat responsive device 20 and the second heat responsive device 22 which are rigidly attached to a heat conducting supporting bracket 28 which is attached to the depressed top portion 19 and to the bottom plate 21 of the casing 14. The bracket 28 is formed of good heat conducting material and is rigidly attached, say, by spot welding, to the top portion 19 of the casing 14 which, in turn, supports the heating element 16. The bracket 28, therefore, provides a good heat conducting path from the heating unit 15 to the thermostatic structure 18. The thermostatic structure 18 thus receives its heat from the heating unit and not directly from the lower vessel, and through the variations in temperature of such heating unit controls the operations thereof.

The first heat responsive device 20 is, in this instance, a snap acting bimetallic element, preferably of the type disclosed in the Valverde Patent 1,980,167. Said element is rigidly attached at one end thereof to the heat conducting bracket 28 by means of a suitable supporting member 30 (see Fig. 2). The bimetallic element or first heat responsive device 20 has an adjustable opening temperature. However, the closing temperature of element 20 remains substantially below that of the serving temperature of the brewed coffee and somewhat above the room temperature. Accordingly, the thermostatic element 20 will always be in a closed position at room temperature. However, it will remain open while the brewed coffee is at the serving temperature. The bimetallic element or first heat responsive device 20 has a centrally located stud-like member 32 rigidly attached thereto for receiving the adjustable control means 24, as hereinafter described. In addition, a movable plunger member 34 is attached to the movable end of such element for engaging the second heat responsive device 22 for a purpose hereinafter described.

The second heat responsive member 22 comprises, in this instance, an elongated plain strip-type bimetallic member located intermediate the first bimetallic member 20 and the supporting bracket 28. The bimetallic member 22 is rigidly attached to the bracket 28 at one end by the supporting bracket 30. The second bimetallic member 22 operates in a normal manner flexing open and closed so as to maintain the brewed coffee at its serving temperature. However, member 22 opens at a lower temperature and develops less flexing power than member 20, for a purpose hereinafter described. A loosely mounted jumper member 35 is attached to the movable end of the bimetallic element 22 so as to engage stationary contacts 36 to energize or deenergize the heating unit 15 in a manner hereinafter described.

The first and second bimetallic members 20 and 22, respectively, are positioned substantially in line with each other so that, when the first member 20 which develops a greater flexing force than the second element 22, is in its closed position, the plunger member 34, attached to the first member, will engage and retain the second bimetallic member in a contact closed or engaged position, until the first bimetallic member snaps to its open or high heat position. Accordingly, it follows that since the flexing force of the second bimetallic element 22 is somewhat less than that of the first bimetallic element 20 the first bimetallic element 20 controls or determines the position maintained by the second bimetallic element.

The manual control or adjusting means 24 comprises, in this instance, an elongated shaft 38 having an inner threaded end portion which threadedly engages the member 32 attached to the element 20. A control knob 40 positioned outside the casing 14 is attached to the outer end of shaft 38 whereby the operator may selectively determine the rotative position of the shaft 38. As the control knob 40 is rotated by an operator, the shaft 38 through its threaded engagement with member 32 determines the longitudinal position of member 32 and of the midpoint of the bimetallic element 20. This selective positioning of the midpoint of element 20 determines or varies the opening temperature of such element, in accordance with well known teachings, and, in turn, as hereinafter described, controls the operation of the coffee-making process.

When operating the coffee maker heater stand 12 embodying my invention, the coffee vessels are positioned thereon in a manner similar to that illustrated in Fig. 1. Water is first placed within the lower vessel and the coffee bean or grounds within the upper vessel, with the lower vessel being sealed by the upper vessel and its gasket in a well known manner. The heating unit 15 is then connected to a suitable power supply (not shown) by means of any well known cord and plug arrangement, also not shown. The heating unit 15 thus, upon heating, increases the temperature of the lower vessel and the fluid therein. Inasmuch as the thermostatic structure is initially at room temperature such structure is in a closed or contact engaged position, due to the first thermostatic element 20 being in its closed or low temperature position, similar to that shown in Fig. 2. The heating unit upon continued operation increases the temperature of the liquid in the lower vessel until the increasing pressure produced by the heated liquid forces such liquid upwardly into the upper vessel, in a well known manner. The heat output of the heating unit at the time the liquid moves into the upper vessel is of such value as to cause the first thermostatic element 20 to snap to its open position. The heating unit 15 is then deenergized, inasmuch as the second bimetallic element 22 opens at a lower temperature and, accordingly, opens with the first bimetallic element 20. It is to be understood that the control knob 40, and, therefore the thermostat 20 are selectively adjustable by an operator to correspond to the quantity of water in the lower vessel. Accordingly, the temperature required for causing the first element 20 to operate will vary with the amount of liquid positioned within the lower vessel. In other words, the operator after having placed a predetermined amount of water within the lower vessel, say, for example, six cups, then rotates the dial 40 to the six-cup position (see Fig. 3). The heat output of the heating unit 15 is thus of such character as to just raise substantially six-cups of liquid to the upper vessel by the time the first bimetallic element snaps open.

If it be desired to have either a weak or strong coffee, the control knob 40 may be positioned either below or above the six-cup position, respectively. This, in turn, regulates the temperature of the liquid in the lower vessel and, accordingly, the pressure produced thereby.

With the liquid elevated to the upper position, infusion takes place with the coffee bean or grounds. Then as the temperature of the lower vessel and heating element decrease the brewed coffee descends to the lower vessel. The first bimetallic element 20, being capable of returning to its closed position only at a point below the serving temperature, remains open. However, the second thermostatic element 22 oscillates between its open and closed position independent of the first element 20 so as to maintain the heat output of the heating unit 15 at such value as to maintain the coffee temperature at its serving temperature of, say, substantially 175° Fahrenheit.

The infusion time is a function of the thermal storage capacity of the heating unit 15 and the rate of cooling thereof. The infusion time should be as short as possible for a good coffee brew. To reduce the infusion time period to a minimum, the lower vessel is left in direct contact with the heater. By leaving the lower vessel in contact with the plate 17 of the heating unit 15 said structures cool faster than when the vessel is raised above the heating unit. This is due to the faster transmission of heat from the unit 15 to the small mount of liquid remaining in the bottom vessel and the faster dissipation of this heat by the vaporization of the liquid than the mere radiation of heat from the unit 15 and coffee vessel when the vessel is removed from the unit.

Accordingly, by leaving the bottom vessel in direct contact with the heating unit plate 17, by controlling the weight of said plate, and securing circulation of air on the bottom and sides of the heater plate (see arrows Fig. 4 which represent the flow of air through the heating stand 12), the infusion time may be accurately controlled. A short infusion period may thus be acquired so as to obtain the optimum in coffee making efficiency.

Referring to Fig. 5, I show a temperature-time curve of the thermostatic structure 18 and bimetallic elements 20 and 22, illustrated by curve OX, and of the water positioned within the lower vessel, illustrated by the curves OR. With the six-cup setting of the control knob 40, as hereinabove described, the bimetallic elements increase in temperature along the line OX to a temperature as illustrated by the dotted line E, at which point the thermostat 20 will snap open, deenergizing the heating element. At this time the temperature of the water is substantially above that of the serving temperature, as illustrated by curve OR and dotted line Z, and will have passed into the upper vessel. Due to the thermal storage capacity of the heating unit including the porcelain plate 17 as well as that of the lower vessel of the percolator 10, a predetermined time B' will pass between said deenergization of the heating element, and the reenergization of the heating element due to the closing of the second bimetallic element 22. During this "infusion time" B' the fluid in the upper vessel cools and returns to the lower vessel. After the second bimetallic element 22 has become reengaged, such element intermittently energizes the heating element 16 which maintains the temperature of the bimetallic elements 20 and 22 at that illustrated by Y on Fig. 5. This, in turn, maintains the temperature of the brewed coffee at substantially that illustrated by the dotted line Z or the curve OR.

It is, therefore, obvious that the described thermostatic control mechanism for a coffee maker stand provides automatic means for heating the water within a coffee maker up to its brewing temperature, and, then, after a predetermined infusion or brewing period, automatically regulates the energization of the heating element to maintain the brewed coffee at a predetermined serving temperature.

Referring to Figs. 6 and 7, a modified form of thermostatic control structure 18a embodying my invention is illustrated. As will be noted, a single thermostatic element, namely, the heretofore so-called second bimetallic element 22, is employed. However, the control means 24a has a cam shaped member 31 attached to the inner end of the control shaft 38. The cam 31 is adapted to engage a pin 27 rigidly attached to substantially the midpoint of a bimetallic element 22. The cam 31 engaging the pin 27 retains the bimetallic element 22 in its contact engagement or closed position during the time the heating element is initially energized or during the time in which the unbrewed water is initially within the lower vessel. Then, as the water moves from the lower vessel to the upper vessel so as to permit infusion of the brew therein, the operator merely rotates the control knob 40 so as to permit the bimetallic element 22 to operate in its normal manner. Such bimetallic element thus permits the temperature of the heating element 16 to return to substantially that illustrated by the dotted line Y in Fig. 5, during the infusion period B', whereupon the bimetallic element 22 maintains the energization of the heating element so as to insure the temperature of the brewed coffee being retained at substantially the serving temperature illustrated by dotted line Z, as hereinabove described.

It is, therefore, obvious that applicant has provided in his modified structure a control means for insuring a coffee brew to be first brought up to its brewing temperature, and then, upon the operation of the control means by an operator, for maintaining such brewed coffee at the desired serving temperature.

It is further obvious that with the structure as set forth herein, it is possible to ensure a predetermined infusion period during the coffee making cycle so as to obtain uniform and satisfactory results when brewing coffee.

While this invention is shown in but two forms, it will be obvious to those skilled in the art that it is not so limited but it is susceptible to various other changes and modifications without departing from the spirit thereof and it is desired, therefore, that only such limitations shall be placed thereon as are specifically set forth in the appended claims.

I claim as my invention:

1. In a coffee maker having a heating element, the combination of a thermostatic structure responsive to the heat produced by the element for regulating the operation of said element to first supply a coffee brewing temperature and then to automatically reduce the heat produced by said element to maintain the coffee at a serving temperature below the brewing temperature, said thermostatic structure comprising a first device responsive to the heat produced by said element for maintaining energization of the heating element to produce a high heat output for a predetermined period, and a second device also responsive to the heat produced by said element for maintaining the energization of the heating element to produce a low heat output whereby the temperature of the brew is automatically retained at a serving temperature somewhat below the brewing temperature.

2. In a coffee maker having a heating element, the combination of a thermostatic structure responsive to the heat produced by the element for regulating the operation of said element to to first supply a coffee brewing temperature and then to automatically reduce the heat produced by said element to maintain the coffee at a serving temperature below the brewing temperature, said thermostatic structure comprising a first bimetallic element responsive to the heat produced by said element and having a closing temperature lower than the serving temperature of the brew for maintaining the energization of the heating element to produce a high heat output for a predetermined period, and a second bimetallic element responsive to the heat produced by said element and having a mean operating temperature intermediate its closing and opening value for intermittently maintaining the energization of the heating element to produce a low heat output whereby the temperature of the brew is automatically retained at a serving temperature below the brewing temperature.

3. In a coffee maker having a heating element, the combination of a thermostatic structure responsive to the heat produced by the element for regulating the operation of said element to first supply a coffee brewing temperature and then to automatically reduce the heat produced by said element to maintain the coffee at a serving temperature below the brewing temperature, said thermostatic structure comprising a first bimetallic element responsive to the heat produced by said element and having a closing temperature lower than the serving temperature of the brew and an adjustable opening temperature for maintaining the energization of the heating element to produce a high heat output for a predetermined period, and a second bimetallic element responsive to the heat produced by said element and having a mean operating temperature intermediate its closing and opening value for intermittently maintaining the energization of the heating element to produce a low heat output whereby the temperature of the brew is automatically retained at a serving temperature below the brewing temperature.

4. In a coffee maker having a heating element, the combination of a thermostatic structure responsive to the heat produced by the element for regulating the operation of said element to first supply a coffee brewing temperature and then to automatically reduce the heat produced by said element to maintain the coffee at a serving temperature below the brewing temperature, said thermostatic structure comprising a first bimetallic element responsive to the heat produced by said element and having a closing temperature lower than the serving temperature of the brew and a selectively adjustable opening temperature for maintaining the energization of the heating element to produce a high heat output for a predetermined period, a second bimetallic element responsive to the heat produced by said element and having a mean operating temperature intermediate its closing and opening value for intermittently maintaining the energization of the heating element to produce a low heat output whereby the temperature of the brew is automatically retained at a serving temperature below the brewing temperature, and means for selectively adjusting the opening temperature of the first bimetallic element in accordance with the quantity of coffee to be brewed whereby the length of the initial heating period will be of the desired time for a given quantity of coffee so as to insure uniform results.

5. In a coffee maker having a heating unit and liquid containing vessel, the combination of a heating stand for retaining said unit, said stand having a plurality of apertures therein for enabling air to pass therethrough and under and upwardly past said unit and in contact with the bottom and sides thereof, said vessel being retained upon and in contact with the unit during the infusion period whereby said period will be reduced to a minimum due to the vaporization of liquid in the vessel and the passage of air about the heating unit.

6. In a coffee maker having a heating unit and a liquid-containing vessel, the combination of a heating stand for retaining said unit, said stand embodying a plurality of apertures therein for enabling air to pass therethrough and under and upwardly past said unit and in contact with the bottom and sides thereof, and an upstanding peripheral flange portion, said vessel being retained upon and in contact with the heating unit and spaced inwardly from the peripheral flange portion of said stand during the infusion period whereby said period will be reduced to a minimum due to the vaporization of liquid in the vessel and the passage of air about the heating unit and along the lower portion of said vessel.

7. In a coffee maker including a liquid-containing vessel, the combination of a heating unit, a stand for supporting said unit embodying a central portion having apertures therein and an upstanding shoulder about the outer edge thereof, means for retaining the heating unit a spaced distance upwardly from said central portion and inwardly from the shoulder to permit the passage of air upwardly through said stand along the bottom and periphery of the heating unit, said vessel being retained upon and in contact with the heating unit and spaced inwardly from the upstanding shoulder of said stand whereby the air passing through said stand and along said heating unit will pass along said vessel so as to rapidly cool the heating unit and vessel due to the vaporization of liquids in the vessel.

KENNETH L. WOODMAN.